L. W. WITRY.
FRICTION CLUTCH.
APPLICATION FILED OCT. 2, 1911.

1,035,669.

Patented Aug. 13, 1912.

Witnesses:
E. C. Jennings
W. H. Brown

Inventor,
L. W. Witry. by
G. C. Kennedy.
Attorney.

UNITED STATES PATENT OFFICE.

LOUIS W. WITRY, OF WATERLOO, IOWA, ASSIGNOR TO WATERLOO GASOLENE ENGINE COMPANY, OF WATERLOO, IOWA.

FRICTION-CLUTCH.

1,035,669.  Specification of Letters Patent.  Patented Aug. 13, 1912.

Application filed October 2, 1911. Serial No. 652,318.

*To all whom it may concern:*

Be it known that I, LOUIS W. WITRY, a citizen of the United States of America, and a resident of Waterloo, Blackhawk county, Iowa, have invented certain new and useful Improvements in Friction-Clutches, of which the following is a specification.

Figure 1:
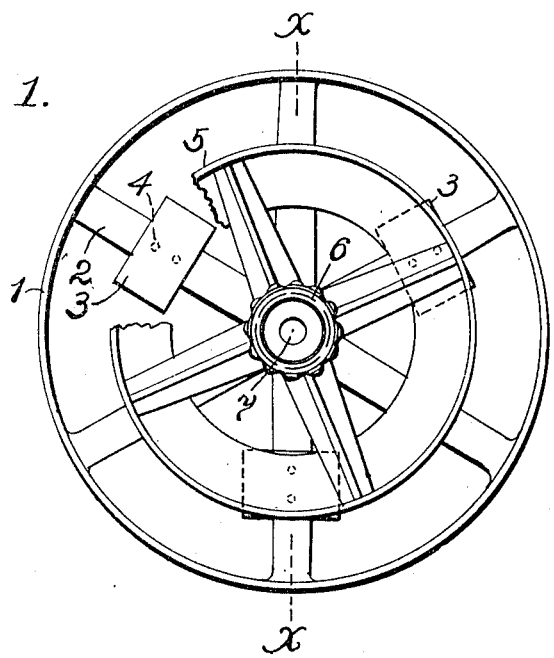
Figure 2:
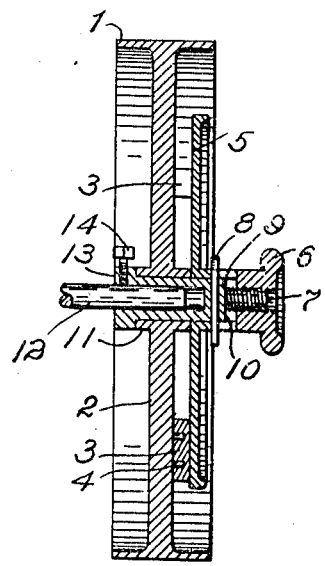

My invention relates to improvements in friction clutches, and the object of my improvement is to provide for use in connection with centrifugal cream separators or other mechanism, simple, cheap, easily managed means whereby power may be communicated from a suitable source to such mechanism without excessive shock or jar with consequent probable damage thereto. This object I have accomplished by the means which are hereinafter described and claimed, and which are illustrated in the accompanying drawings, in which:

Figure 1 is a front elevation of my improved friction clutch as operatively connected to a driving-belt wheel. Fig. 2 is a vertical, axial transverse section of the parts shown in Fig. 1, taken along the line $x\ x$ of said Fig. 1.

Similar numerals of reference designate corresponding parts throughout the several views.

The numeral 12 designates the driving-shaft of any mechanism, such as that of a centrifugal cream separator, while the numeral 10 designates a body having a socket adapted to receive the end of said shaft, and a set-screw 14 working in an expanded portion 13 of said body acts to removably secure it upon said shaft. The body 10 has a projecting outwardly threaded screw 7 which is alined and coaxial with said shaft, and upon which a cap-nut 6 is removably seated. On the cylindrical portion of said body 10 between the expansion 13 thereof and the said cap-nut 6, the hollow hubs 11 and 9 of the belt-wheel 1 and of the friction-disk 5 are respectively seated, the belt-wheel being loose on said sleeve while the friction-disk is secured to the sleeve by means of a cotter-pin 8 passed through registering grooves in said hub 9 and an orifice in the solid portion of said sleeve lying between the end of said shaft and the screw 6. On that side of the spokes 2 of said belt-wheel 1 which faces the friction-disk 5 are located on several of said spokes in a desired number, small projections or cylindrical studs 4, spaced apart along the spokes, and which are adapted to be received in and fit within the corresponding sockets provided therefor in the friction-blocks 3, the latter being made of wood or any other suitable material. The blocks 3 thus seated on said studs lie between the said spokes and the abutting face of said friction-disk 5. When the cap-nut 6 is left loose on the screw 7, the friction-disk 5 bears little if at all upon said blocks 3, and the rotation of said belt-wheel 1 is not communicated to said disk. When, however, the cap-nut 6 is moved toward said friction-disk, the nut compresses the hub 9 causing the latter to slide over the pin 8 and forcing the friction-disk against the blocks 3 tightly enough to cause rotation to be communicated from said belt-wheel to said disk and by consequence to the shaft 12. Since the hub 9 is grooved to receive said pin 8, the operation is thus made possible. Since the separator-shaft 12 is to be rotated at a rate of only about 50 revolutions per minute, it is obviously safe to turn said cap-nut 6 by hand to release it from the hub 9, to disengage the belt-wheel from said shaft, and stop the latter, without stopping the driving-member.

Since the cap-nut is centrally located the operation above indicated may be quickly and easily performed, and the pressure of the friction-disk against said blocks be made so gradual that no shock or jar will be communicated to the shaft 12 and the mechanism driven thereby.

Having described my invention, what I claim as new, and desire to secure by Letters Patent, is:

1. In combination, a driven shaft, a driving-wheel loosely but non-slidably mounted thereon, a plurality of removable friction-blocks mounted on one side of said wheel, a friction-disk coaxial with said wheel and movable to and from it, and means for gradually advancing said disk into frictional contact with said friction-blocks.

2. In combination, a driven shaft, a sleeve removably secured on one end thereof and provided with a coaxial alined outwardly-threaded projection and having a raised ring about its other end, a friction-disk slidably but non-rotatably mounted on said sleeve, a driving-wheel loosely but slidably mounted on said sleeve between said fillet and said friction-disk, a plurality of friction-blocks, removably mounted on that side of said wheel which is adjacent to said friction-disk, and an adjusting-nut movably seated on said threaded projection and adapted to bear gradually upon said disk to cause the latter to gradually come into frictional contact with said friction-blocks.

3. In combination, a driven-shaft, a sleeve removably secured on one end thereof and provided with a coaxial alined outwardly threaded projection and having a fillet about its other end, a friction-disk rigid with a hub movably mounted on said sleeve, said hub having its outer end diametrically grooved, said sleeve having a transverse orifice in registration with said groove, a pin seated in said orifice and groove, the said hub being slidable on said sleeve about said pin, a driving-wheel loosely but non-slidably mounted on said sleeve between said fillet and said friction-disk, a plurality of spaced-apart friction-blocks removably mounted on that side of said wheel which is adjacent to said friction-disk and being equidistant from the axis of said wheel, and an adjusting-nut movable on said projection and adapted to gradually force said friction-disk against said blocks.

Signed at Waterloo, Iowa, this 14th day of Sept. 1911.

LOUIS W. WITRY.

Witnesses:
WILLIAM E. FERGUSON,
F. J. HADISH.